(12) United States Patent
Samie et al.

(10) Patent No.: US 8,512,204 B2
(45) Date of Patent: Aug. 20, 2013

(54) METHOD AND APPARATUS EFFECTING TORQUE TRANSFER THROUGH A TRANSMISSION DURING ENGINE AUTOSTOP AND AUTOSTART EVENTS

(75) Inventors: Farzad Samie, Franklin, MI (US); Chunhao J. Lee, Troy, MI (US); Kumaraswamy V. Hebbale, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 314 days.

(21) Appl. No.: 12/908,125

(22) Filed: Oct. 20, 2010

(65) Prior Publication Data
US 2012/0100947 A1  Apr. 26, 2012

(51) Int. Cl.
*B60W 10/00* (2006.01)

(52) U.S. Cl.
USPC .......................................................... 477/83

(58) Field of Classification Search
USPC .................. 477/86, 125; 475/116, 144, 281, 475/283, 285, 287, 291, 292, 307, 314, 320, 475/324
See application file for complete search history.

(56) References Cited

U.S. PATENT DOCUMENTS

| 6,244,965 | B1 | 6/2001 | Klecker et al. |
| 6,739,440 | B1 | 5/2004 | Dick |
| 7,942,781 | B2 * | 5/2011 | Kimes ............................. 477/5 |
| 8,029,403 | B2 * | 10/2011 | Lee et al. ..................... 475/276 |
| 8,029,404 | B2 * | 10/2011 | Borgerson ................... 475/280 |
| 8,177,677 | B2 * | 5/2012 | Samie et al. ................. 475/324 |
| 2005/0130789 | A1 | 6/2005 | Samie et al. |
| 2010/0063693 | A1 | 3/2010 | Lee et al. |
| 2010/0063694 | A1 | 3/2010 | Lee et al. |
| 2010/0063698 | A1 | 3/2010 | Lee et al. |

* cited by examiner

*Primary Examiner* — David D Le
*Assistant Examiner* — David J Hlavka

(57) ABSTRACT

A powertrain system includes an engine coupled via an input member to a transmission to transfer torque to an output member. The engine is configured to execute an autostop event and an autostart event during ongoing powertrain operation. The transmission includes a plurality of planetary gear sets and a plurality of torque transfer clutches. The plurality of torque transfer clutches includes hydraulically-activated clutches and mechanical clutch devices, including an electromechanically-activated selectable one-way clutch. The transmission is configured to provide hydraulic pressure to activate the hydraulically-activated clutches using only a mechanically driven hydraulic pump. The transmission is configured to effect torque transfer among the input member, the plurality of planetary gear sets and the output member in one of a plurality of fixed gear states by selectively activating at least one of the plurality of torque transfer clutches.

13 Claims, 3 Drawing Sheets

METHOD AND APPARATUS EFFECTING TORQUE TRANSFER THROUGH A TRANSMISSION DURING ENGINE AUTOSTOP AND AUTOSTART EVENTS

TECHNICAL FIELD

This disclosure is related to powertrain transmissions.

BACKGROUND

The statements in this section merely provide background information related to the present disclosure and may not constitute prior art.

Hydraulic pressure is used to activate some known torque-transfer clutches, including multi-plate friction clutches used on powertrain systems including hybrid powertrain systems. Known multi-plate friction clutches may have spin losses caused in part by fluid that resists rotation of clutch elements when a clutch is deactivated. Hydraulic pressure can be provided by a mechanically driven hydraulic pump that uses power originating from an engine.

Known powertrain systems include engine systems that stop operating during ongoing powertrain operation, including during a traffic stop, referred to as an autostop event. Subsequently, the engine can be restarted to provide tractive power, referred to as an autostart event. Known powertrain systems having engines configured to execute autostop and autostart events use electrically-powered auxiliary pump systems to supplement a mechanically driven hydraulic pump. Such electrically-powered auxiliary pump systems provide hydraulic pressure to activate and maintain activation of torque transfer clutches during autostop events when the mechanically driven hydraulic pump is not operating. An electrically-powered auxiliary pump system adds mass, increases complexity of hydraulic circuits and electrical circuits, consumes packaging space, and requires additional control circuitry.

SUMMARY

A powertrain system includes an engine coupled via an input member to a transmission to transfer torque to an output member. The engine is configured to execute an autostop event and an autostart event during ongoing powertrain operation. The transmission includes a plurality of planetary gear sets and a plurality of torque transfer clutches. The plurality of torque transfer clutches includes hydraulically-activated clutches and mechanical clutch devices, including an electromechanically-activated selectable one-way clutch. The transmission is configured to provide hydraulic pressure to activate the hydraulically-activated clutches using only a mechanically driven hydraulic pump. The transmission is configured to effect torque transfer among the input member, the plurality of planetary gear sets and the output member in one of a plurality of fixed gear states by selectively activating at least one of the plurality of torque transfer clutches.

BRIEF DESCRIPTION OF THE DRAWINGS

One or more embodiments will now be described, by way of example, with reference to the accompanying drawings, in which.

DETAILED DESCRIPTION

Figure 1:
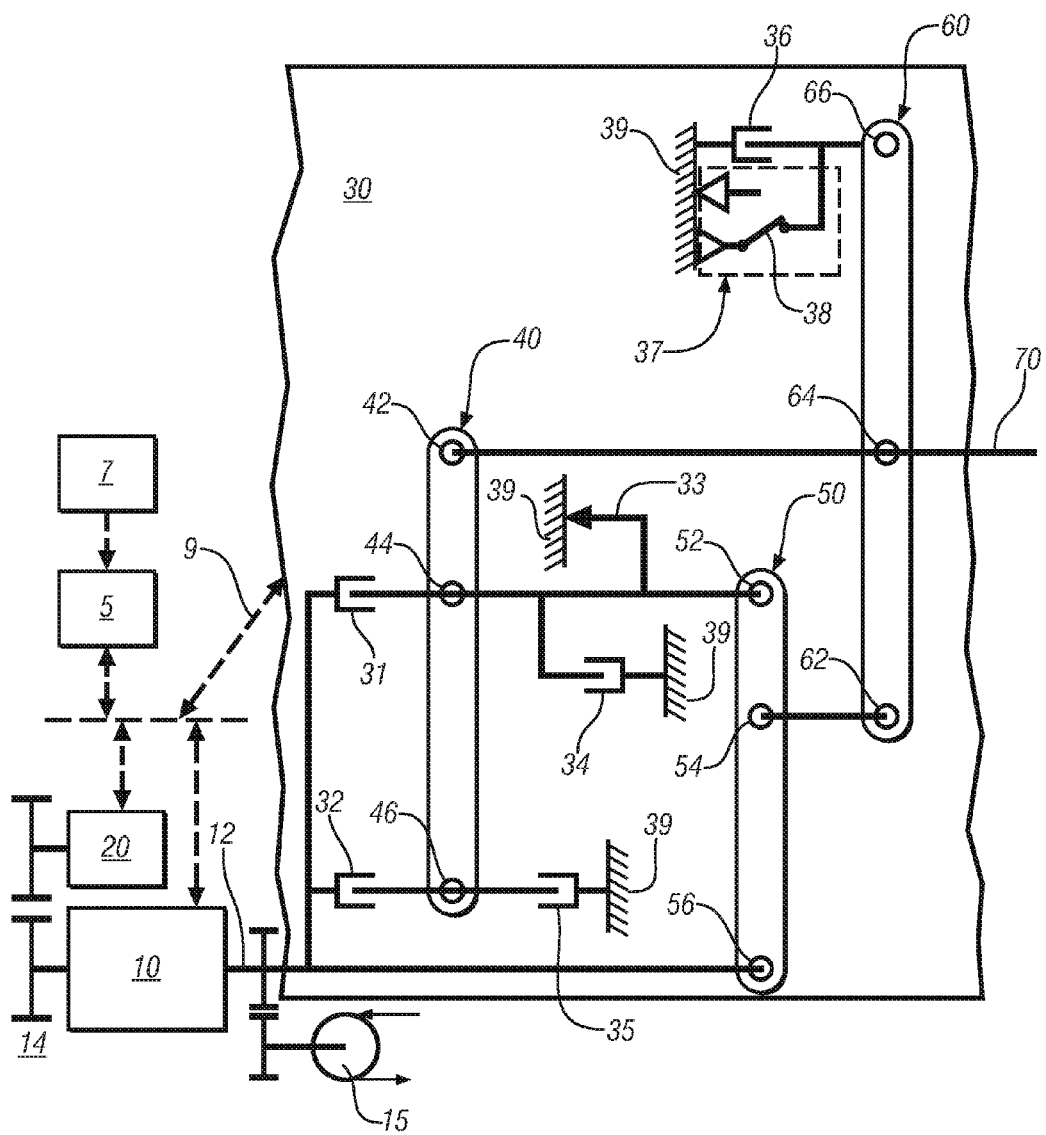
FIGS. 1, 2 and 3 are schematic illustrations of powertrain systems including an internal combustion engine and embodiments of an exemplary transmission in accordance with the disclosure.
Figure 2:
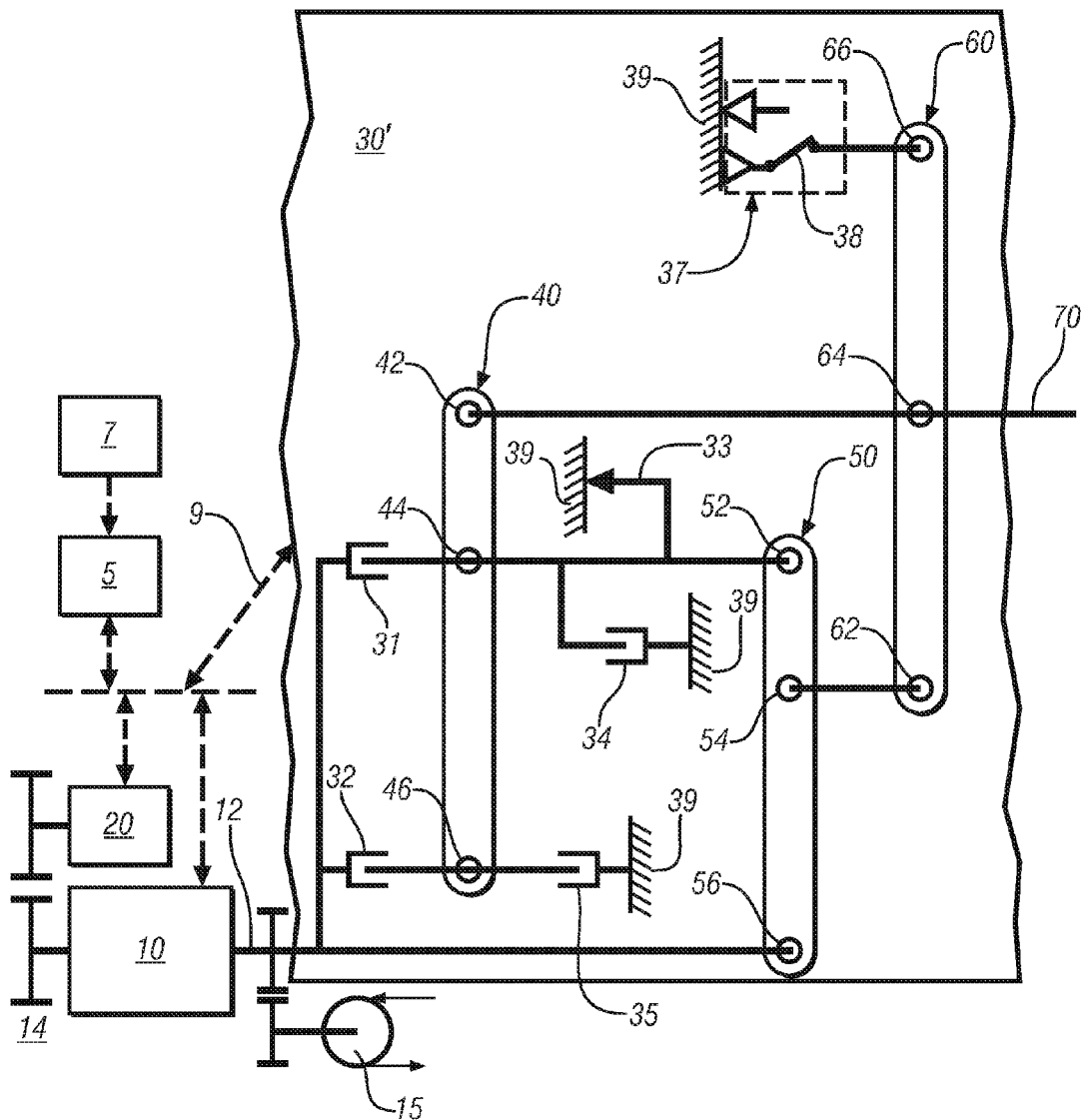
Figure 3:
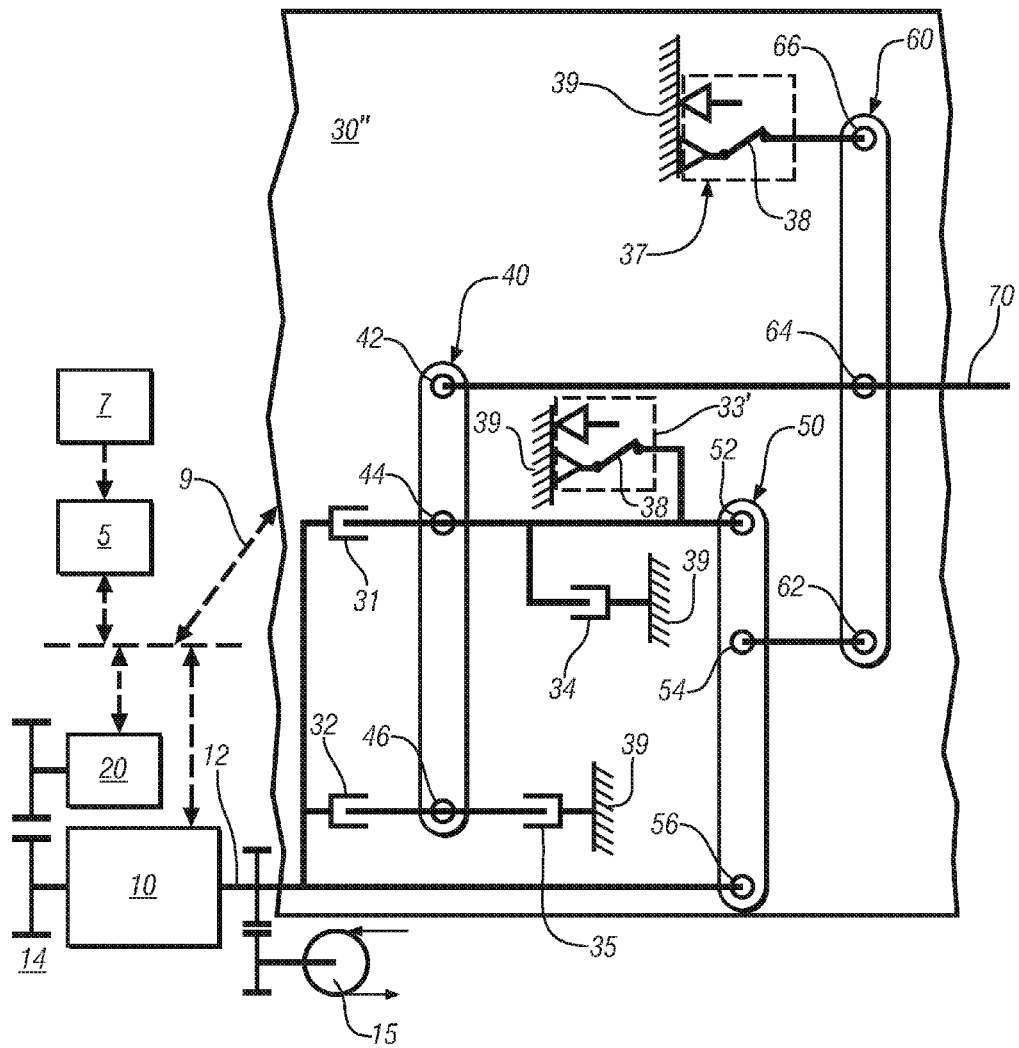

Referring now to the drawings, wherein the showings are for the purpose of illustrating certain exemplary embodiments only and not for the purpose of limiting the same, FIGS. 1, 2, and 3 schematically illustrate embodiments of a powertrain system including an internal combustion engine 10, a transmission 30, and an auxiliary motor 20. The internal combustion engine 10 is coupled via an input member 12 to the transmission 30 to transfer torque to an output member 70. The output member 70 can be coupled to any suitable device, including, e.g., a driveline for a vehicle to provide propulsion torque to driven wheels. The internal combustion engine 10 mechanically couples via a suitable drive system 14 to the auxiliary motor 20. A mechanically driven hydraulic pump 15 is coupled to the input member 12, and provides pressurized hydraulic fluid to a hydraulic circuit of the transmission 30 to activate selected ones of hydraulically-activated clutch devices, as described herein. The mechanically-driven hydraulic pump 15 is configured to exclusively provide hydraulic pressure to activate the hydraulically-activated clutches, i.e., there is no auxiliary hydraulic pump element for providing supplemental hydraulic fluid flow and pressure to the hydraulic circuit of the transmission 30, and there is no hydraulic pump element driven by a non-mechanical power source for providing supplemental hydraulic fluid flow and pressure to the hydraulic circuit of the transmission 30.

A control module 5 is signally and operatively connected to elements of the engine 10, auxiliary motor 20, and transmission 30 via a communications bus 9, and is signally connected to a user interface 7. The user interface 7 provides signals indicating operator commands, including, e.g., inputs from an accelerator pedal and brake pedal indicating an operator torque request, and inputs from a transmission range selector (PRNDL) indicating a selected direction of travel.

The auxiliary motor 20 may operate as a motor to transform stored energy to mechanical power to generate torque to spin the engine 10, including during engine starting events. The auxiliary motor 20 may operate as a generator to transform torque from the engine 10 to generate power that can be stored in an on-board energy storage device as potential energy. In one embodiment, the auxiliary motor 20 is an electric machine configured to electrically charge an on-board battery, but the concepts described herein are not so limited. In one embodiment, the auxiliary motor 20 may be a low voltage (e.g., 12 V) electric motor configured to spin the engine during starting and restarting events.

The auxiliary motor 20 may be configured to use any suitable form of stored energy, e.g., hydraulic, pneumatic, or other. The control module 5 is configured to execute an autostop event control scheme to automatically stop operation of the engine 10 during ongoing powertrain operation in response to states of vehicle and powertrain operating conditions including vehicle speed and operator inputs. The operator inputs preferably include an operator input to an accelerator pedal. By way of a non-limiting example, the control module 5 executes the autostop event control scheme to automatically stop operation of the engine 10 when vehicle speed is less than 5 km/h and an operator input to an accelerator pedal is less than 1%. Ongoing powertrain operation refers to a period of operation during which an operator has requested vehicle operation using an ignition key or another suitable command which may be referred to as key-on.

The control module 5 is configured to execute an autostart event control scheme to automatically start and restart operation of the engine 10 subsequent to an autostop event during ongoing powertrain operation in response to states of vehicle and powertrain operating conditions. By way of a non-limiting example, the control module 5 executes the autostart event control scheme to automatically restart the engine 10 when an operator input to an accelerator pedal is greater than 5%, or, alternatively, when operator input to a brake pedal is released. The autostart event control scheme includes suitable control commands that cause the auxiliary motor 20 to spin the engine 10 and deliver fuel and spark as necessary to effect operation of the engine 10.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

FIGS. 1, 2, and 3 show first, second, and third embodiments of an exemplary powertrain system including the auxiliary motor 20, internal combustion engine 10, and transmission 30. The transmission 30 is depicted as a six-speed fixed gear transmission, although the present disclosure is not limited to such configurations. The transmission 30 is configured to transfer torque at fixed speed ratios between the input member 12 and the output member 70. The transmission 30 includes three differential gear sets 40, 50, and 60, which in one embodiment are simple planetary gear sets including elements of ring gears 42, 52, and 62, respectively, planet gears 44, 54, and 64, respectively, and sun gears 46, 56, and 66 respectively. Specific elements of the three differential gear sets 40, 50, and 60 are fixedly interconnected to effect torque transfer. Specific other elements of the three differential gear sets 40, 50, and 60 are selectively interconnected or connected to a transmission case ground 39 using selective activation of specific torque-transfer clutches to effect torque transfer at fixed speed ratios between the input member 12 and the output member 70. The three differential gear sets 40, 50, and 60 rotate in concert to achieve one of the specific fixed speed ratios between the input member 12 and the output member 70. The embodiments of the transmission 30 include torque-transfer clutches C1 31, C2 32, one or both C3 33 and C4 34, C5 35, and one or both C6 36 and C7 37.

Clutches C1 31, C2 32, C4 34, C5 35, and C6 36 are preferably hydraulically-activated multi-plate friction-type clutch devices. Clutches C3 33, C4 34, C5 35, C6 36 and C7 37 are configured as brake devices that ground rotation of the attached element to the transmission case ground 39. Hydraulic pressure to activate clutches C1 31, C2 32, C4 34, C5 35, and C6 36 is generated using the mechanically driven hydraulic pump 15 that is mechanically-driven using power from the engine 10 via input member 12. Thus, when the engine 12 is off, e.g. subsequent to an autostop event, there is no hydraulic pressure available to activate the aforementioned clutches.

Clutch C3 33 is a mechanically activated one-way clutch and clutch C7 37 is an electromechanical clutch device, preferably an electrically-activated selectable one-way clutch. Electrical signals for activating and deactivating clutch C7 37 originate in the control module 5 and control an electrically controlled device, e.g., an electromagnetic solenoid device 38 that is mechanically coupled to a moveable control element of the electro mechanical clutch device to effect torque transfer in either of first and second rotational directions.

A mechanical clutch device effects a coupling between first and second elements using devices that are configured to mechanically couple to transfer torque. In one embodiment, the first and second elements are coaxial rotatable devices that rotate in concert and transfer torque when mechanically coupled. In one embodiment, the first element is a rotatable element and the second element is a fixed element, e.g., a mechanical ground, with rotation of the first element grounded when the first and second elements are mechanically coupled. Rotational speeds of the first and second elements must be synchronized in order to mechanically couple them to transfer torque. In one embodiment of the mechanical clutch device, the first element includes a plate device having one or a plurality of recesses, notches or similar features. The second element includes a plate device having retractable struts, sprags, rollers or similar devices that are configured to project from the surface of the second element and correspond to the plurality of recesses, notches or similar features of the first element.

A selectable one-way clutch device includes a moveable control element located between the first and second elements, with its position controlled using an electromagnetic solenoid device. When the moveable control element is controlled to a first position, the struts, sprags, or rollers are retracted and the mechanical clutch device is deactivated. Thus, the first and second coaxial elements lack any mechanical connection and are able to rotate in a freewheel manner relative to one another. When the moveable control element is controlled to a second position, the struts, sprags, or rollers of the second element project from the surface to mechanically interfere with and connect to the plurality of recesses, notches or similar features of the first element, and transfer torque thereby. The first and second elements rotate in concert relative to one another when the mechanical clutch device is activated.

The mechanical clutch device can be a one-way mechanical clutch device configured to transfer torque from a first, drive element to a second, driven element when activated with the drive element rotating in a first direction. When there is a change in direction of torque transfer, the driven element freewheels relative to the drive element.

The mechanical clutch device can be a two-way mechanical clutch device configured to effect torque transfer between the first, drive element and the second, driven element when activated with the drive element rotating in either of a first and a second direction to transfer torque to the driven element.

The mechanical clutch device can be a selectable one-way clutch device. A selectable one-way clutch device is configured to operate as one of a one-way clutch in a first direction, a one-way clutch in a second opposite direction, and a two-way mechanical clutch device, depending upon location of the moveable control element. The selectable one-way clutch device is preferably electrically activated using an actuator, which is a solenoid device in one embodiment.

The mechanical clutch device includes a deactivation state, wherein the first, drive element is decoupled from the second, driven element, and the drive and driven elements are freewheeling.

Clutch C7 37 is an electromechanically-activated selectable one-way clutch. Clutch C3 33 is a mechanically activated one-way clutch in one embodiment, and clutch C3 33' is an electromechanically-activated selectable one-way clutch in one embodiment.

Actuators 38 are configured to control moveable control elements associated with clutch C7 37 and clutch C3 33'. Each actuator 38 can include any suitable electrically controlled device, e.g., an electro-mechanical solenoid device that is controlled with a control signal originating in the control module 5. A signal output from the control module 5 controls position of actuator 38, which controls position of the moveable control element and thus controls activation and deactivation of the associated clutch. Actuators 38 control activation and deactivation of the clutch C7 37 and clutch C3 33' as selectable one-way clutch devices, including operation as a one-way clutch in a first direction, a one-way clutch in a second, opposite direction, as a two-way mechanical clutch device, and in a deactivation state.

FIG. 1 depicts a first embodiment of the powertrain system, which includes the transmission 30 having clutches C1 31, C2 32, C3 33, C4 34, C5 35, C6 36 and C7 37. Clutch C3 33 is configured as a mechanically activated one-way clutch and clutch C7 37 is configured as an electromechanically-activated selectable one-way clutch. Clutches C1 31, C2 32, C4 34, C5 35, and C6 36 are hydraulically-activated friction clutch elements in one embodiment. Clutches C3 33 and C4 34 are arranged in parallel to couple ring gear 52 of the second planetary gear set 50 to planet gears 44 of the first planetary gear set 40 when either or both of clutches C3 33 and C4 34 are activated. Clutches C6 36 and C7 37 are arranged in parallel to ground rotation of the sun gear 66 of the third planetary gear set 60 when either or both of clutches C6 36 and C7 37 are activated. Activation of specific clutches associated with specific fixed gear states is shown with reference to Table 1. This includes an engine-off gear state that occurs during an autostop event (Drive-Off) and is active preferably during a subsequent autostart event. Clutches C3 33 and C7 37 are activated during the engine-off gear state during ongoing powertrain operation to effect torque transfer between the input member 12 and the output member 70. During operation of the powertrain system with the engine 10 in the On state, the clutches C3 33 and C7 37 are deactivated, with torque transfer across the respective elements being accomplished using the parallel clutch elements C4 34 and C6 36. Clutch C3 33 is mechanically activated and clutch C7 37 is activated by a control signal originating from the control module 5, without need or requirement of hydraulic pressure for clutch activation. Thus, there is no need for an electrically-driven auxiliary hydraulic pump. Clutches C3 33 and C7 37 are activated only during the engine-off gear state during ongoing powertrain operation, and are deactivated when powertrain operation is discontinued, e.g., in response to an operator key-off.

TABLE 1

| Gear State | Engine State | Activated Clutches | | | | | | |
|---|---|---|---|---|---|---|---|---|
| | | 33 OWC | 34 | 35 | 32 | 31 | 37 SOWC | 36 |
| Rev | On | x | | | x | | | |
| N | On | | | | | | | |
| $1^{st}$ | On | | x | | | | | x |
| $2^{nd}$ | On | | | x | | | | x |
| $3^{rd}$ | On | | | | x | | | x |
| $4^{th}$ | On | | | | | x | | x |
| $5^{th}$ | On | | | | x | x | | |
| $6^{th}$ | On | | | x | | x | | |
| Drive | Off | x | | | | | x | |

FIG. 2 shows a second embodiment of the powertrain system including transmission 30', which includes clutches C1 31, C2 32, C3 33, C4 34, C5 35, and C7 37. Clutch C3 33 is configured as a mechanically activated one-way clutch and clutch C7 37 is configured as an electromechanically-activated selectable one-way clutch. Clutches C1 31, C2 32, C4 34, and C5 35 are hydraulically-activated friction clutch elements in one embodiment. Clutches C3 33 and C4 34 are arranged in parallel to couple ring gear 52 of the second planetary gear set 50 to planet gears 44 of the first planetary gear set 40 when activated. Clutch C7 37 grounds rotation of the sun gear 66 of the third planetary gear set 60 when activated. Activation of specific clutches associated with specific gear states is shown with reference to Table 2. This includes an engine-off gear state that occurs during an autostop event (Drive-Off) and is active preferably during a subsequent autostart event. Clutches C3 33 and C7 37 are activated during the engine-off gear state to effect torque transfer between the input member 12 and the output member 70. During operation of the powertrain system with the engine 10 in the On state, the clutch C3 33 is deactivated, with torque transfer across the respective elements being accomplished using the parallel clutch C4 34. Clutch C3 is mechanically activated and clutch C7 37 is activated by a control signal originating from the control module 5, without need or requirement of hydraulic pressure for clutch activation.

TABLE 2

| Gear State | Engine State | Activated Clutches | | | | | |
|---|---|---|---|---|---|---|---|
| | | 33 OWC | 34 | 35 | 32 | 31 | 37 SOWC |
| Rev | On | x | | | x | | |
| N | On | | | | | | |
| $1^{st}$ | On | | x | | | | x |
| $2^{nd}$ | On | | | x | | | x |
| $3^{rd}$ | On | | | | x | | x |
| $4^{th}$ | On | | | | | x | x |
| $5^{th}$ | On | | | | x | x | |
| $6^{th}$ | On | | | x | | x | |
| Drive | Off | x | | | | | x |

FIG. 3 shows a third embodiment of the powertrain system including transmission 30", which includes clutches C1 31, C2 32, C3 33', C5 35, and C7 37. Clutch C3 33' and clutch C7 37 are both configured as electromechanically-activated selectable one-way clutches. Clutches C1 31, C2 32, and C5 35 are hydraulically-activated friction clutch elements in one embodiment. Clutch C3 33' is arranged to couple ring gear 52 of the second planetary gear set 50 to planet gears 44 of the first planetary gear set 40 when activated. Clutch C7 37 grounds rotation of the sun gear 66 of the third planetary gear set 60 when activated. Activation of specific clutches associated with specific gear states is shown with reference to Table 3. This includes an engine-off gear state that occurs during an autostop event (Drive-Off) and is active preferably during a subsequent autostart event. Clutches C3 33 and C7 37 are activated during the engine-off gear state to effect torque transfer between the input member 12 and the output member 70. Clutches C3 33' and C7 37 are also used during operation of the powertrain system with the engine 10 in the On state to transfer torque across the respective elements.

Clutches C3 33' and C7 37 are activated by control signals originating from the control module 5, without need or requirement of hydraulic pressure for clutch activation.

TABLE 3

| Gear State | Engine State | Activated Clutches | | | | |
|---|---|---|---|---|---|---|
| | | 33' SOWC | 35 | 32 | 31 | 37 SOWC |
| Rev | On | x | | x | | |
| N | On | | | | | |
| $1^{st}$ | On | x | | | | x |
| $2^{nd}$ | On | | x | | | x |
| $3^{rd}$ | On | | | x | | x |
| $4^{th}$ | On | | | | x | x |
| $5^{th}$ | On | | | x | x | |
| $6^{th}$ | On | | x | | x | |
| Drive | Off | x | | | | x |

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A powertrain system including an engine coupled via an input member to a transmission to transfer torque to an output member, comprising:
   the engine configured to execute an autostop event and an autostart event during ongoing powertrain operation;
   the transmission comprising a plurality of planetary gear sets and a plurality of torque transfer clutches;
   the plurality of torque transfer clutches comprising hydraulically-activated clutches and mechanical clutch devices comprising an electromechanically-activated selectable one-way clutch;
   the transmission configured to provide hydraulic pressure to activate the hydraulically-activated clutches using only a mechanically driven hydraulic pump; and
   the transmission configured to effect torque transfer among the input member, the plurality of planetary gear sets and the output member in one of a plurality of fixed gear states by selectively activating at least one of the plurality of torque transfer clutches, wherein selectively activating said at least one of the plurality of torque transfer clutches comprises activating only the mechanical clutch devices including the electromechanically-activated selectable one-way clutch when the engine executes an autostart event during ongoing powertrain operation.

2. The powertrain system of claim 1, wherein the mechanical clutch devices further comprises a mechanically activated one way clutch.

3. The powertrain system of claim 1, wherein the mechanical clutch devices further comprises a second electromechanically-activated selectable one-way clutch.

4. A powertrain system including an engine coupled via an input member to a transmission to transfer torque to an output member, comprising:
   the engine configured to execute an autostop event and an autostart event during ongoing powertrain operation;
   the transmission comprising a plurality of planetary gear sets and a plurality of torque transfer clutches;
   the plurality of torque transfer clutches comprising hydraulically-activated clutches and mechanical clutch devices comprising an electromechanically-activated selectable one-way clutch;
   the transmission configured to provide hydraulic pressure to activate the hydraulically-activated clutches using only a mechanically driven hydraulic pump; and
   the transmission configured to effect torque transfer among the input member, the plurality of planetary gear sets and the output member in one of a plurality of fixed gear states by selectively activating at least one of the plurality of torque transfer clutches, wherein the transmission is configured to operate in one of the plurality of fixed gear states by activation of only the mechanical clutch devices subsequent to the engine executing an autostop event.

5. A powertrain system including an engine coupled via an input member to a transmission to transfer torque to an output member, comprising:
   the engine configured to execute an autostop event and an autostart event during ongoing powertrain operation;
   the transmission comprising a plurality of planetary gear sets and a plurality of torque transfer clutches;
   the plurality of torque transfer clutches comprising hydraulically-activated clutches and mechanical clutch devices comprising an electromechanically-activated selectable one-way clutch;
   the transmission configured to provide hydraulic pressure to activate the hydraulically-activated clutches using only a mechanically driven hydraulic pump; and
   the transmission configured to effect torque transfer among the input member, the plurality of planetary gear sets and the output member in one of a plurality of fixed gear states by selectively activating at least one of the plurality of torque transfer clutches, wherein the transmission is configured to operate in one of the plurality of fixed gear states by activation of only the mechanical clutch devices prior to the engine executing an autostart event.

6. The powertrain system of claim 1, wherein one of the hydraulically-activated clutches is arranged in parallel with one of the mechanical clutch devices.

7. The powertrain system of claim 6, wherein the one of the hydraulically-activated clutches arranged in parallel with the one of the mechanical clutch devices grounds an element of one of the planetary gear sets.

8. A powertrain system, comprising:
   an engine coupled via an input member to a transmission to transfer torque to an output member, the engine configured to automatically stop and automatically restart during ongoing powertrain operation;
   the transmission configured to operate in one of a plurality of fixed gear states by selective activation of a plurality of clutches, the plurality of clutches comprising a plurality of hydraulically-activated clutches and a plurality of mechanical clutch devices including an electromechanically-activated selectable one-way clutch; and
   the mechanical clutch devices configured to effect torque transfer between the input and output members of the transmission when the engine is automatically restarted, wherein the engine is coupled to a torque machine to effect rotation of the engine to automatically restart during ongoing powertrain operation and wherein the mechanical clutch devices when activated transfer torque from the torque machine to the output member via the engine and the transmission.

9. The powertrain system of claim 8, wherein the transmission comprises a plurality of planetary gear sets, wherein selected elements of the planetary gear sets are mechanically coupled by activation of at least one of the hydraulically-activated clutches arranged in parallel with one of the mechanical clutch devices.

10. A powertrain system, comprising:
an engine configured to execute an autostop event and an autostart event;
a transmission comprising a plurality of planetary gear sets, a plurality of torque transfer clutches, an input member and an output member, the plurality of torque transfer clutches comprising a plurality of hydraulically-activated clutches and a plurality of mechanical clutch devices, the transmission configured to effect torque transfer from the engine to the output member via the input member and the plurality of planetary gear sets by selectively activating at least one of the plurality of torque transfer clutches; and
a mechanically-driven hydraulic pump configured to exclusively provide hydraulic pressure to activate the hydraulically-activated clutches, wherein the mechanically-driven hydraulic pump is mechanically coupled to the input member.

11. A powertrain system, comprising:
an engine configured to execute an autostop event and an autostart event;
a transmission comprising a plurality of planetary gear sets, a plurality of torque transfer clutches, an input member and an output member, the plurality of torque transfer clutches comprising a plurality of hydraulically-activated clutches and a plurality of mechanical clutch devices, the transmission configured to effect torque transfer from the engine to the output member via the input member and the plurality of planetary gear sets by selectively activating at least one of the plurality of torque transfer clutches; and
a mechanically-driven hydraulic pump configured to exclusively provide hydraulic pressure to activate the hydraulically-activated clutches,
wherein selectively activating said at least one of the plurality of torque transfer clutches comprises activating only the mechanical clutch devices when the engine executes the autostart event.

12. The powertrain system of claim 11, wherein the plurality of mechanical clutch devices comprises a mechanically-activated selectable one-way clutch and an electromechanically-activated selectable one-way clutch.

13. The powertrain system of claim 11, wherein the plurality of mechanical clutch devices includes two electromechanically-activated selectable one-way clutches.

* * * * *